US012682117B2

(12) United States Patent
Kang et al.

(10) Patent No.: US 12,682,117 B2
(45) Date of Patent: Jul. 14, 2026

(54) SECURITY-BY-DESIGN METHODOLOGY USING EVIDENCE-BASED SECURITY APPROACH

(71) Applicant: Korea University Research and Business Foundation, Seoul (KR)

(72) Inventors: Sooyoung Kang, Seoul (KR); Seungjoo Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 403 days.

(21) Appl. No.: 17/622,965

(22) PCT Filed: Oct. 12, 2020

(86) PCT No.: PCT/KR2020/013835
§ 371 (c)(1),
(2) Date: Feb. 9, 2023

(87) PCT Pub. No.: WO2022/010039
PCT Pub. Date: Jan. 13, 2022

(65) Prior Publication Data
US 2023/0222247 A1     Jul. 13, 2023

(30) Foreign Application Priority Data

Jul. 10, 2020    (KR) ........................ 10-2020-0085599
Oct. 8, 2020    (KR) ........................ 10-2020-0130540

(51) Int. Cl.
*G06F 21/62*         (2013.01)
*G06Q 10/101*       (2023.01)

(52) U.S. Cl.
CPC ......... *G06F 21/629* (2013.01); *G06Q 10/101* (2013.01)

(58) Field of Classification Search
CPC ........ G06F 21/629; G06F 21/55; G06F 21/57; G06F 21/86; G06Q 10/101; G06Q 10/06; G06Q 10/0635
See application file for complete search history.

(56) References Cited

U.S. PATENT DOCUMENTS 7,669,238 B2 *   2/2010  Fee .......................... G06F 21/51
                                                          713/170
8,122,426 B2 *   2/2012  Isom ........................ G06F 8/10
                                                          717/109
10,740,469 B2 *  8/2020  Zheng ..................... G06F 8/427
                        (Continued)

FOREIGN PATENT DOCUMENTS

CN          109559016 A  *  4/2019
WO     WO 2013/054961 A1     4/2013

OTHER PUBLICATIONS

Nayerifard, Tahereh, Nasser Modiri, and Sam Jabbehdari. "An approach for software security evaluation based on ISO/IEC 15408 in the ISMS implementation." Int J Comput Sci Inf Secur 11.9 (2013): 7. (Year: 2013).*

(Continued)

*Primary Examiner* — Michael R Vaughan
(74) *Attorney, Agent, or Firm* — NSIP Law

(57) ABSTRACT

Disclosed is a security-by-design method according to some exemplary embodiments of the present disclosure. The security-by-design method may include: mapping the security-by-design methodology and an evidence-based security methodology; and storing a mapping result in a database.

9 Claims, 10 Drawing Sheets

(56)                     References Cited

U.S. PATENT DOCUMENTS

| | | | |
|---|---|---|---|
| 2003/0233575 A1 * | 12/2003 | Syrjanen | G06F 21/552 |
| | | | 726/25 |
| 2009/0064087 A1 | 3/2009 | Isom | |
| 2012/0254829 A1 * | 10/2012 | Bhalla | G06F 8/34 |
| | | | 717/100 |
| 2013/0019315 A1 | 1/2013 | Chen et al. | |
| 2019/0114435 A1 | 4/2019 | Bhalla et al. | |
| 2019/0132350 A1 * | 5/2019 | Smith | G06F 21/60 |
| 2019/0205542 A1 * | 7/2019 | Kao | G06F 8/10 |
| 2020/0162499 A1 * | 5/2020 | Alsharif | G06F 21/577 |
| 2021/0105304 A1 * | 4/2021 | Kraning | G06Q 10/08 |

OTHER PUBLICATIONS

Jin Seok, Park, "Combining Secure Software Development Lifecycle with Common Criteria", *Department of Information Security Graduate School of Information Security Korea University*, pp. 1-28, Dec. 2013.

Leal, Rhand, "How to integrate ISO 27001 A.14 controls into the system/software development life cycle (SDLC)", pp. 1-8, Feb. 24, 2017 [Search date: Mar. 19, 2021]. source <https://advisera.com/27001academy/blog/2017/01/24/how-to-integrate-iso-27001-a-14-controls-into-the-system-software-development-lifecycle-sdlc>.

* cited by examiner

[Fig. 1]
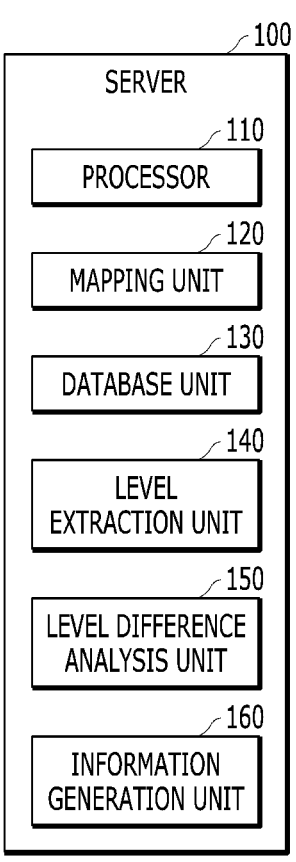

[Fig. 2]
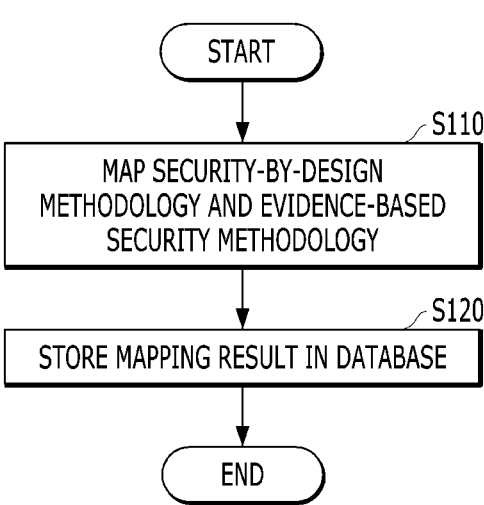

FIG. 3A

| STEP | No | SECURITY ACTIVITY | PRODUCT |
|---|---|---|---|
| 1. SECURITY TRAINING | 1 | BASIC SECURITY TRAINING | - WRITTEN SECURITY TRAINING PLAN - TRAINING PARTICIPANT LIST |
| | 2 | INTENSIFYING SECURITY TRAINING | |
| | 3 | SECURITY TRAINING RELATED SCHEDULE PLANNING | |
| 2.INITIATION | 4 | PROJECT CATEGORIZATION | - WRITTEN CURRENT PROCESS ANALYSIS - WRITTEN CURRENT SYSTEM ANALYSIS - WRITTEN PROJECT PLAN - WRITTEN REQUIREMENT DEFINITION |
| | 5 | ROLE IDENTIFICATION | |
| | 6 | SECTION OF TOOL TO BE USED FOR PROJECT | |
| | 7 | SECURITY REQUIREMENT SOURCE IDENTIFICATION | |
| | 8 | MINIMUM QUALITY AND SECURITY LEVEL DEFINITION | |
| | 9 | ESTABLISHMENT OF COMPENSATION SYSTEM FOR SECURITY ISSUE PROCESSING | |
| | 10 | SECURITY SCHEDULE PLANNING AND MANAGEMENT | |
| | 11 | SECURITY GOAL SETTING | |
| | 12 | VERIFICATION OF CONSISTENCY AND COMPLETENESS OF SECURITY GOAL | |
| 3. REQUIREMENTS ANALYSIS | 13 | CALCULATION OF PROJECT SECURITY ANALYSIS RANGE | - WRITTEN IMPACT EVALUATION - WRITTEN INTERFACE DEFINITION |
| | 14 | PRIVACY INFORMATION PROTECTION IMPACT EVALUATION | |
| | 15 | IMPACT EVALUATION ON BUSINESS | |
| | 16 | SAFETY IMPACT EVALUATION | |
| | 17 | CONVENTIONAL SOFTWARE EVALUATION | |
| | 18 | FUNCTION REQUIREMENT DERIVATION | |
| | 19 | SECURITY REQUIREMENT DERIVATION | |
| | 20 | JUDGMENT OF CONFORMITY FOR REQUIREMENT FOR EACH FIELD, AND COLLISION OR NOT | |
| | 21 | VERIFICATION OF REQUIREMENT ACCORDING TO SECURITY GOAL | |
| 4. ACQUISITION | 22 | ACQUISITION RANGE AND PLAN ESTABLISHMENT | - WRITTEN ACQUISITION INSPECTION |
| | 23 | DEFINITION OF SECURITY REQUIREMENT FOR THIRD-PARTY COMPONENT | |
| | 24 | EVALUATION AND TEST OF SECURITY REQUIREMENT FOR THIRD-PARTY COMPONENT | |

FIG. 3B

| STEP | No | SECURITY ACTIVITY | PRODUCT |
|---|---|---|---|
| 5. DESIGN | 25 | SECURITY FUNCTION DESIGN AND SPECIFICATION | - DESIGN SPECIFICATION<br>- WRITTEN SW ARCHITECTURE DESIGN<br>- WRITTEN SYSTEM ARCHITECTURE DESIGN<br>- WRITTEN INTEGRATED TEST PLAN AND INTEGRATED TEST SCENARIO |
| | 26 | DESIGN EXEMPLARY CASE AND PRINCIPLE COMPLIANCE | |
| | 27 | STRUCTURE DESIGN FOR INTEGRATION PROCESS | |
| | 28 | ASSET IDENTIFICATION | |
| | 29 | DATA FLOWCHART CREATION | |
| | 30 | THREAT DERIVATION | |
| | 31 | ATTACK LIBRARY COLLECTION | |
| | 32 | RISK ANALYSIS | |
| | 33 | MITIGATION PLAN DERIVATION | |
| | 34 | PRIVACY INFORMATION PROTECTION ANALYSIS | |
| | 35 | USE AND MISUSE CASE IDENTIFICATION | |
| | 36 | VERIFICATION OF DESIGN ACCORDING TO REQUIREMENT | |
| 6. IMPLEMENTATION | 37 | CODING GUIDELINE COMPLIANCE | - SOURCE CODE<br>- WRITTEN UNIT TEST PLANE AND TEST SCENARIO<br>- WRITTEN UNIT TEST RESULT |
| | 38 | RELEASE GUIDELINE DOCUMENT AND TOOL CREATION | |
| | 39 | IMPLEMENTATION VERIFICATION ACCORDING TO DESIGN | |
| 7. VERIFICATION | 40 | MANUAL STATIC ANALYSIS | - WRITTEN INTEGRATION/ SYSTEM/ACQUISITION TEST PLAN AND TEST SCENARIO<br>- WRITTEN INTEGRATION/ SYSTEM/ACQUISITION TEST RESULT<br>- WRITTEN VULNERABILITY ANALYSIS |
| | 41 | AUTOMATIC STATIC ANALYSIS | |
| | 42 | DYNAMIC ANALYSIS | |
| | 43 | INTEGRATION AND ACQUISITION TEST | |
| | 44 | PENETRATION TEST | |
| | 45 | THREAT MODEL REVIEW AND UPDATE | |
| | 46 | MINIMUM QUALITY AND SECURITY LEVEL REVIEW | |
| | 47 | SECURITY DOCUMENT REVIEW AND UPDATE | |

FIG. 3C

| STEP | No | SECURITY ACTIVITY | PRODUCT |
|---|---|---|---|
| 8. RELEASE | 48 | FINAL SECURITY REVIEW | - WRITTEN REHEARSAL PLAN AND REHEARSAL RESULT<br>- WRITTEN RELEASE REQUEST |
| | 49 | FINAL PRIVACY INFORMATION PROTECTION REVIEW | |
| | 50 | DERIVATION OF REQUIREMENT FOR PRODUCTION | |
| | 51 | PRODUCTION PROCEDURE DETERMINATION | - WRITTEN EMERGENCY ACCIDENT RESPONSE PLAN<br>- WRITTEN EMERGENCY ACCIDENT RESPONSE RESULT |
| | 52 | VERIFICATION FOR PRODUCTION | |
| | 53 | EMERGENCY ACCIDENT RESPONSE PLAN | |
| | 54 | SECURITY REVIEW FOR RELEASE PROCESS | |
| 9. OPERATION | 55 | MONITORING TARGET INDEX AND DATA COLLECTION AND REPORTING STRATEGY IDENTIFICATION | - WRITTEN INSTALLATION RESULT<br>- OPERATOR GUIDELINE<br>- USER GUIDELINE<br>- WRITTEN VULNERABILITY RESPONSE PLAN<br>- WRITTEN VULNERABILITY PATCH RESULT |
| | 56 | CONTINUOUS MONITORING | |
| | 57 | VULNERABILITY REPORTING | |
| | 58 | EVALUATION FOR VULNERABILITY | |
| | 59 | SOLUTION ESTABLISHMENT | |
| | 60 | VULNERABILITY OPENING AND UPDATE MANAGEMENT | |
| | 61 | SHAPE MANAGEMENT AFTER RELEASE | |
| 10. DISPOSAL | 62 | DISPOSAL AND TRANSITION PLAN ESTABLISHMENT | - WRITTEN SYSTEM EXECUTION PLAN AND SYSTEM EXECUTION RESULT |
| | 63 | IMPORTANT INFORMATION PRESERVATION | |
| | 64 | COMPLETE MEDIUM REMOVAL | |
| | 65 | HARDWARE AND SOFTWARE DISPOSAL | |
| | 66 | SYSTEM SHUTDOWN | |

[Fig. 4]

| STANDARD | CLASSIFICATION | NUMBER |
|---|---|---|
| ISO/IEC 15408 - CC | 1. SECURITY GOAL SPECIFICATION | 10 |
| | 2. DEVELOPMENT | 19 |
| | 3. INSTALLATION AND OPERATION | 2 |
| | 4. LIFECYCLE SUPPORT | 18 |
| | 5. TEST | 9 |
| | 6. VULNERABILITY EVALUATION | 5 |
| CC SUM | 63 WARRANTY REQUIREMENT COMPONENTS | |
| ISO 27001 - ISMS | 1. INFORMATION PROTECTION POLICY | 6 |
| | 2. INFORMATION PROTECTION ORGANIZATION | 4 |
| | 3. OUTSIDER SECURITY | 3 |
| | 4. INFORMATION ASSET CLASSIFICATION | 3 |
| | 5. INFORMATION PROTECTION TRAINING | 4 |
| | 6. PERSONNEL SECURITY | 5 |
| | 7. PHYSICAL SECURITY | 9 |
| | 8. SYSTEM DEVELOPMENT SECURITY | 10 |
| | 9. PASSWORD CONTROL | 2 |
| | 10. ACCESS CONTROL | 14 |
| | 11. OPERATION SECURITY | 22 |
| | 12. INFRINGEMENT ACCIDENT MANAGEMENT | 7 |
| | 13. IT DISASTER RESTORATION | 3 |
| | 14. INFORMATION PROTECTION MANAGEMENT | 12 |
| ISMS SUM | 104 DETAILED INSPECTION ITEMS | |
| ISO/IEC 27701 - PIMS | 1. PRIVACY INFORMATION PROTECTION MANAGEMENT SYSTEM OF TARGET INSTITUTION | 8 |
| | 2. PRIVACY INFORMATION PROTECTION MANAGEMENT SYSTEM OF TARGET SYSTEM | 6 |
| | 3. PROTECTION ACTION FOR EACH PRIVACY INFORMATION PROCESSING STEP | 12 |
| | 4. TECHNICAL PROTECTION ACTION OF TARGET SYSTEM | 19 |
| | 5. PRIVACY INFORMATION PROTECTION UPON UTILIZING SPECIFIC IT TECHNOLOGY | 9 |
| PIMS SUM | 54 DETAILED EVALUATION ITEMS | |
| SUM TOTAL | 221 DETAILED SECURITY ACTIVITIES | |

[Fig. 5]
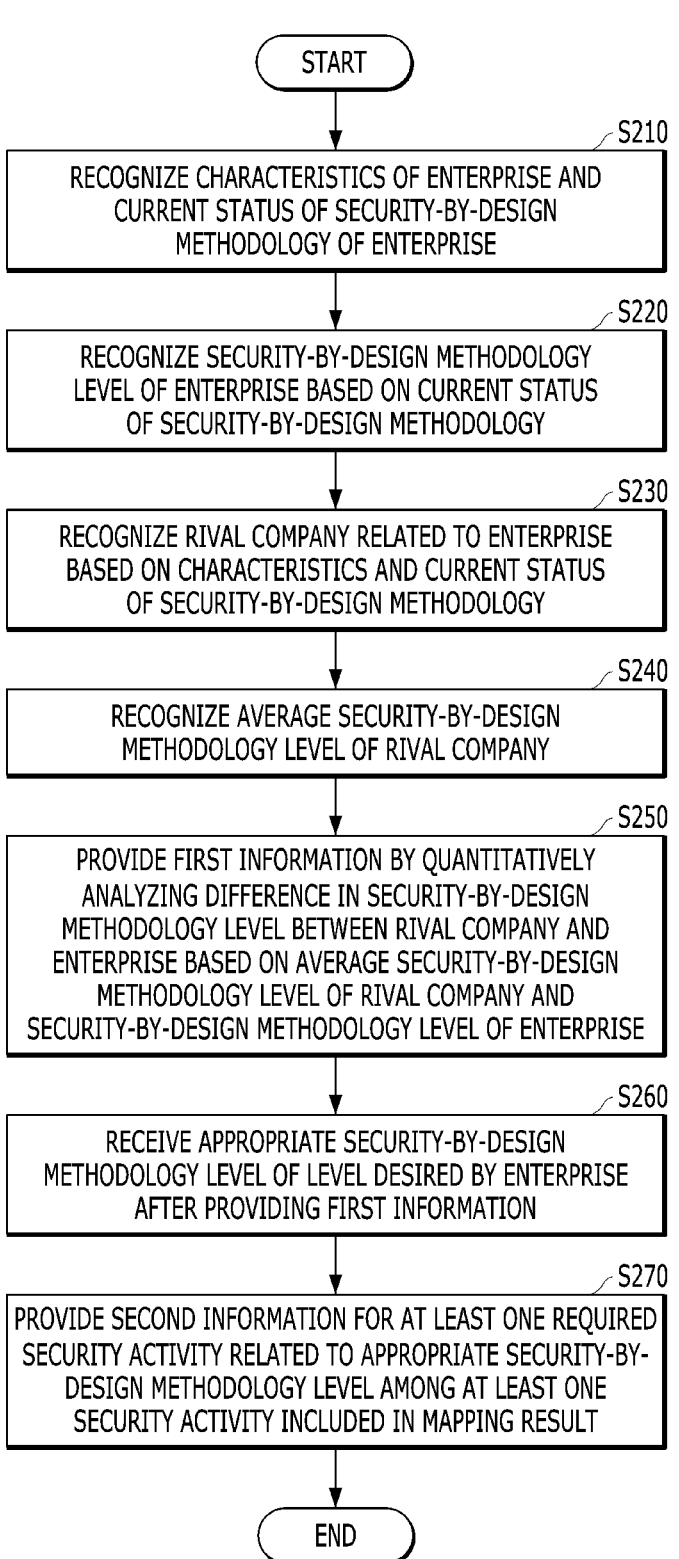

[Fig. 6]
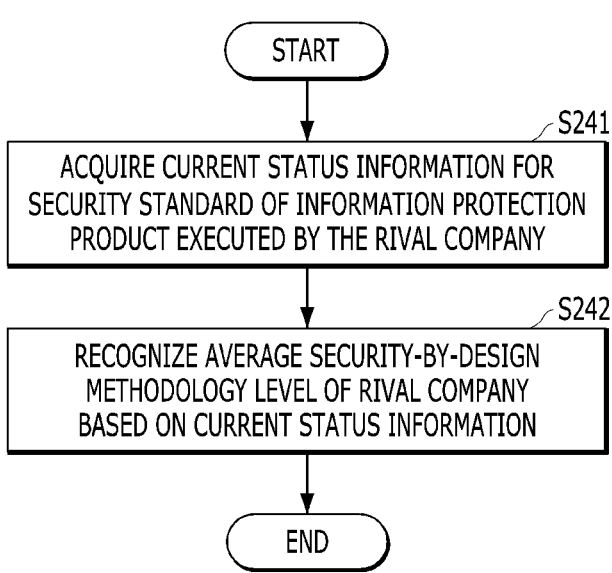

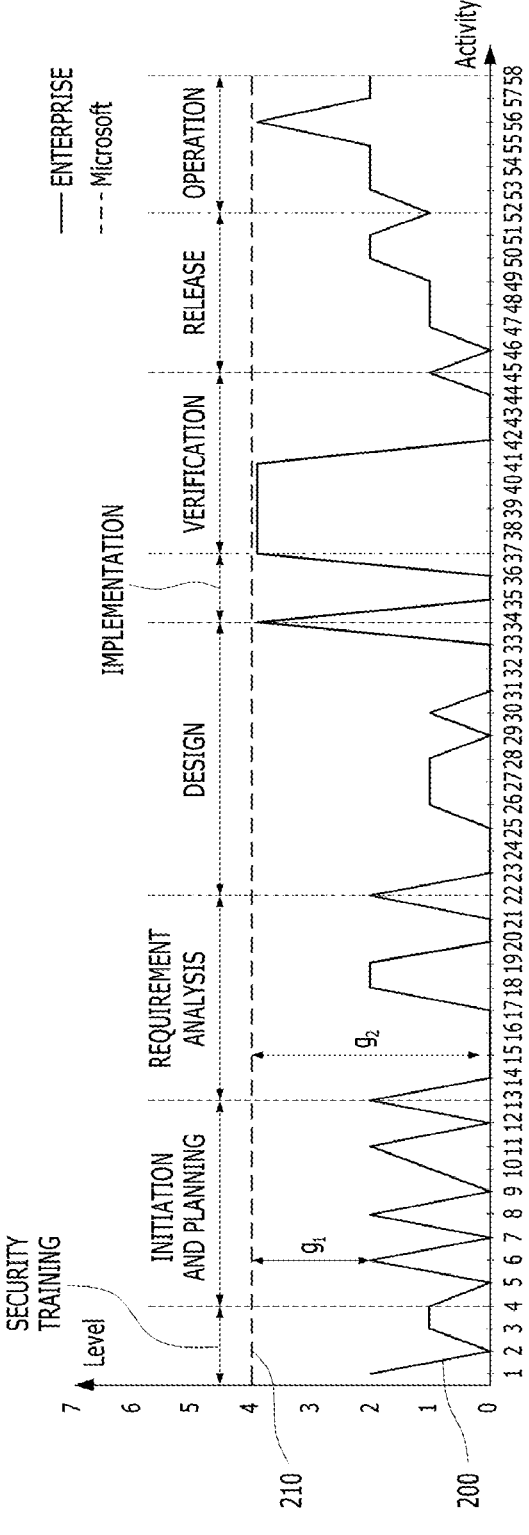
[Fig. 7]

[Fig. 8]
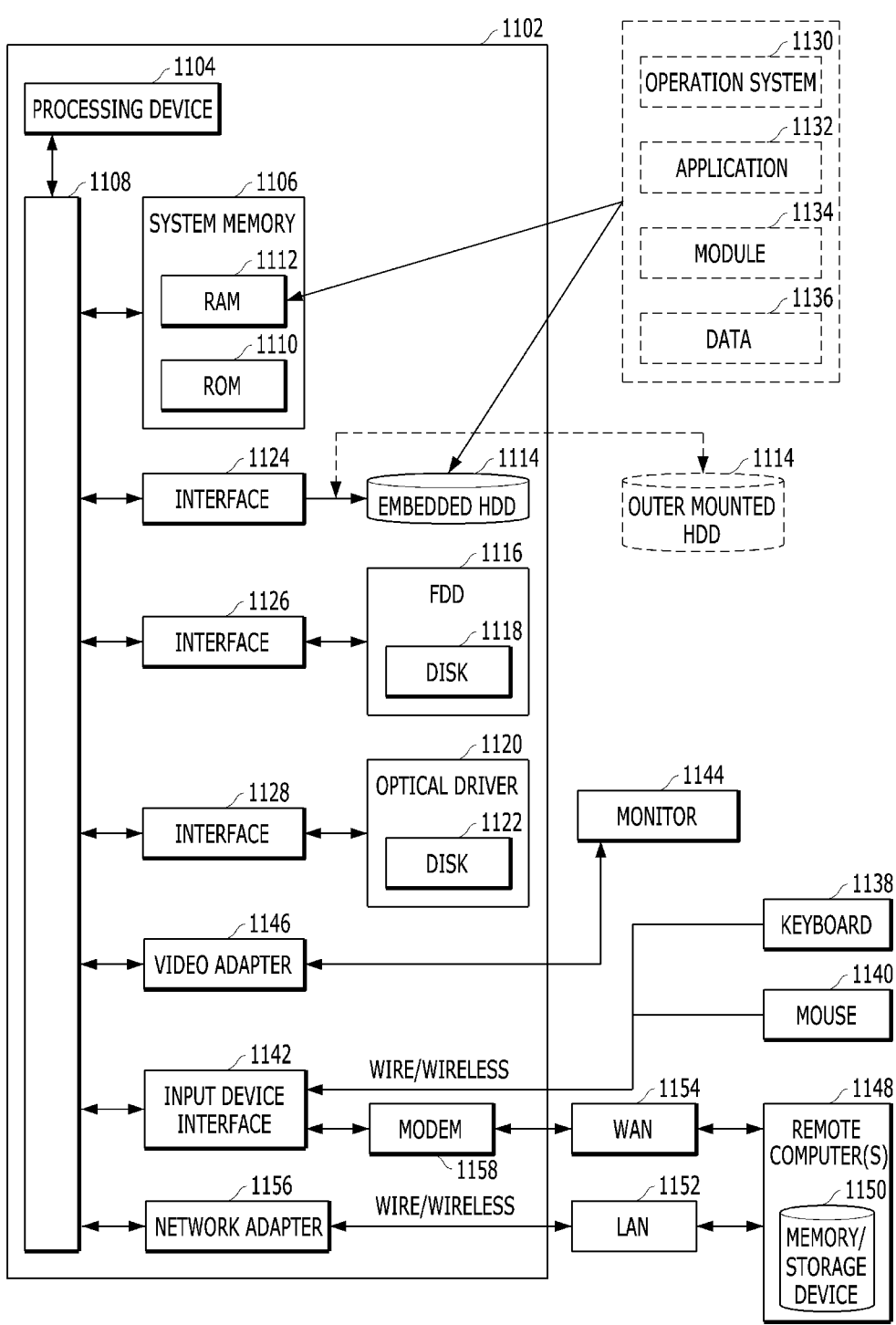

SECURITY-BY-DESIGN METHODOLOGY USING EVIDENCE-BASED SECURITY APPROACH

CROSS REFERENCE TO RELATED APPLICATIONS

This application is a U.S. National Stage Application of International Application No. PCT/KR2020/013835, filed on Oct. 12, 2020, which claims the benefit under 35 USC 119(a) and 365(b) of Korean Patent Application No. 10-2020-0085599, filed on Jul. 10, 2020, and Korean Patent Application No. 10-2020-0130540, filed on Oct. 8, 2020 in the Korean Intellectual Property Office, the entire disclosures of which are incorporated herein by reference for all purposes.

TECHNICAL FIELD

The present disclosure relates to a security-by-design methodology, and particularly, to a security-by-design methodology using an evidence-based security approach.

BACKGROUND ART

The US government has performed improvement of a computing product through simulated hacking since 1970s. However, a method through the simulated hacking has a problem in that a vulnerability is determined according to a capability and a performing period of a simulated hacking team, and it is not guaranteed that there is no vulnerability in a target product because the vulnerability is not discovered.

Thereafter, in order to enhance a security quality of the product, the United States recognizes that a development process itself should be systematically and strictly managed instead of depending on finding and patching the vulnerability, and starts to announce various development methodologies related to security by design, and evaluation and procurement system related standards.

Here, the security by design is to reduce complexity of the product and achieve reliability by considering the security from an initial development stage such as requirement analysis and design of the product. In addition, a development process including the security by design may be referred to as "Secure Secure Software Development Life Cycle (SDLC)" or "Security Engineering Process".

However, since only abstractive security activity lists are enumerated in standards and guidelines of Secure SDLCs which are currently opened, it is not easy to construct the secure SDLC in an actual field.

Accordingly, there is a demand for a security by design methodology for embodying the secure SDLC according to a level desired by enterprises.

SUMMARY OF THE INVENTION

The present disclosure has been made in an effort to provide a security-by-design method using an evidence-based approach.

However, technical objects of the present disclosure are not restricted to the technical object mentioned as above. Other unmentioned technical objects will be apparently appreciated by those skilled in the art by referencing to the following description.

An exemplary embodiment of the present disclosure provides a method for embodying a security-by-design methodology using a processor of a computing device, which may include: mapping the security-by-design methodology and an evidence-based security methodology; and storing a mapping result in a database.

The mapping result may include at least one security step, at least one security activity, at least one detailed security activity, and a product.

Further, the at least one security step may include at least one of a first step related to security training, a second step related to initiation and planning, a third step related to requirement analysis, a fourth step related to acquisition, a fifth step related to design, a sixth step related to implementation, a seventh step related to verification, an eighth step related to release, a ninth step related to operation, and a tenth step related to disposal.

Further, the method may further include: recognizing characteristics of an enterprise and a current status of the security-by-design methodology of the enterprise; recognizing a security-by-design methodology level of the enterprise based on the current status of the security-by-design methodology; recognizing a rival company related to the enterprise based on the characteristics and the current status of the security-by-design methodology; recognizing an average security-by-design methodology level of the rival company; and providing first information by quantitatively analyzing a difference in security-by-design methodology level between the rival company and the enterprise based on the average security-by-design methodology level of the rival company and the security-by-design methodology level of the enterprise.

Further, the recognizing an average security-by-design methodology level of the rival company may include acquiring current status information for a security standard of an information protection product executed by the rival company; and recognizing the average security-by-design methodology level of the rival company based on the current status information.

Further, the mapping result includes security-by-design methodology level information in which security-by-design methodology levels granted to an each of plurality of detailed security activities included in each of the at least one security activity is recorded, and wherein the recognizing a security-by-design methodology level of the enterprise based on the mapping result and the current status of the security-by-design methodology may include recognizing the security-by-design methodology level of the enterprise for each of the at least one security activity based on the security-by-design methodology level information and the current status of the security-by-design methodology.

Further, the method may include: receiving an appropriate security-by-design methodology level of a level desired by the enterprise after providing the first information; and providing second information for at least one required security activity related to the appropriate security-by-design methodology level among at least one security activity included in the mapping result.

Further, the second information may include at least one required product mapped to each of at least one required security including at least one required security activity.

Further, the first information may quantitatively indicate the difference in security-by-design methodology level in a graph form.

Further, the graph may include an x axis representing each of the at least one detailed security activity, a y axis representing the security-by-design methodology level for each of the at least one detailed security activity, a first line representing the average security-by-design methodology level of the rival company, and a second line representing the security-by-design methodology level of the enterprise.

Further, the graph may quantitatively represent the difference in security-by-design methodology level between the rival company and the enterprise based on a gap formed by a clearance between the first line and the second line.

Another exemplary embodiment of the present disclosure provides a security-by-design device, which may include: a mapping unit mapping a security-by-design methodology and an evidence-based security methodology; and a database unit storing a mapping result.

Further, the security-by-design device may further include: a level extraction unit recognizing characteristics of an enterprise and a current status of the security-by-design methodology of the enterprise, recognizing a security-by-design methodology level of the enterprise based on the current status of the security-by-design methodology, and recognizing a rival company related to the enterprise based on the characteristics and the current status of the security-by-design methodology, recognizing an average security-by-design methodology level of the rival company'; a level difference analysis unit providing first information by quantitatively analyzing a difference in security-by-design methodology level between the rival company and the enterprise based on the average security-by-design methodology level of the rival company and the security-by-design methodology level of the enterprise; and an information generation unit providing second information for at least one required security activity related to an appropriate security-by-design methodology level of a level desired by the enterprise among at least one security activity included in the mapping result.

Technical solving means which can be obtained in the present disclosure are not limited to the aforementioned solving means and other unmentioned solving means will be clearly understood by those skilled in the art from the following description.

Technical solving means which can be obtained in the present disclosure are not limited to the aforementioned solving means and other unmentioned solving means will be clearly understood by those skilled in the art from the following description.

According to some exemplary embodiments of the present disclosure, a security-by-design methodology can be provided, which is capable of easily determining a security level of a user.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

FIG. 1 is a block diagram for describing an example of a server according to some exemplary embodiments of the present disclosure.

FIG. 2 is a flowchart for describing an example of a method for storing a mapping result in a database by a server according to some exemplary embodiments of the present disclosure.

FIGS. 3A to 3C are diagrams for describing an example of a mapping result stored in a database unit according to some exemplary embodiments of the present disclosure.

FIG. 4 is a diagram for describing an example of a mapping result according to some exemplary embodiments of the present disclosure.

FIG. 5 is a flowchart for describing an example of a method for providing second information by a server according to some exemplary embodiments of the present disclosure.

FIG. 6 is a flowchart for describing an example of a method for recognizing an average security-by-design methodology level of a rival company by a server according to some exemplary embodiments of the present disclosure.

FIG. 7 is a diagram for describing an example of a graph generating in order to analyze a difference between an enterprise' and a rival company by a server according to some exemplary embodiments of the present disclosure.

FIG. 8 is a general schematic view of an exemplary computing environment in which exemplary embodiments of the present disclosure may be implemented.

DETAILED DESCRIPTION

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Hereinafter, like reference numerals refer to like or similar elements regardless of reference numerals and a duplicated description thereof will be omitted. Further, in describing an exemplary embodiment disclosed in the present disclosure, a detailed description of related known technologies will be omitted if it is determined that the detailed description makes the gist of the exemplary embodiment of the present disclosure unclear. Further, the accompanying drawings are only for easily understanding the exemplary embodiment disclosed in this specification and the technical spirit disclosed by this specification is not limited by the accompanying drawings.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present invention pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or it is not clear in terms of the context that a singular form is indicated, it should be construed that the singular form generally means "one or more" in this specification and the claims.

Further, the terms "information" and "data" used in the specification may also be often used to be exchanged with each other.

It should be understood that, when it is described that a component is "connected to" or "accesses" another component, the component may be directly connected to or access the other component or a third component may be present therebetween. In contrast, it should be understood that, when it is described that a component is "directly connected to" or "directly access" another component, no component is present between the component and another component.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention or a usual practice of a user or an operator.

However, the present disclosure is not limited to exemplary embodiments disclosed below but may be implemented in various different forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

FIG. 1 is a block diagram for describing an example of a server according to some exemplary embodiments of the present disclosure.

Referring to FIG. 1, a server 100 may include a processor 110, a mapping unit 120, a database unit 130, a level extraction unit 140, a level difference analysis unit 150, and an information generation unit 160. However, components described above are not required in implementing the server 100 and the server 100 may thus have components more or less than components listed above.

The server 100 may include, for example, a predetermined type of computer system or computer device such as a microprocessor, a mainframe computer, a digital processor, a portable device, and a device controller. However, the present disclosure is not limited thereto.

Meanwhile, the processor 110 may generally process an overall operation of the server 100. The processor 110 processes a signal, data, information, and the like input or output through the components of the server or drives the application program stored in the database unit 130 to provide or process information or a function appropriate for the user.

Meanwhile, the mapping unit 120 may map a security-by-design methodology and an evidence-based security methodology. Here, the security-by-design methodology may include a secure SDLC standard and a guideline. As an example, the security-by-design methodology may include Secure SDLC standards and guidelines such as Microsoft SDL, NIST SSDLC, CSA SDF, OWASP CLASP, McGraw, Touchpoints, SAFECode, OWASP BSIMM, OWASP SAMM, NIST RMF, and SAEJ3061. However, the present disclosure is not limited thereto. Meanwhile, the evidence-based security methodology may include standards ISO/IEC 15408-Common Criteria (CC), ISO/IEC 27001 Information Security Management System (ISMS), ISO/IEC 27701-Privacy Information Management System (PIMS), and ISO/IEC 8405-Common Evaluation Methodology (CEM). However, the present disclosure is not limited thereto. Hereinafter, the mapping unit 120 will be described below with reference to FIG. 2.

Meanwhile, according to some exemplary embodiments of the present disclosure, the mapping unit 120 may compare and analyze steps included in the security-by-design methodology.

Specifically, the mapping unit 120 may combine duplicated security activities among security activities included in a plurality of secure SDLC standards and guidelines included in the security-by-design methodology, respectively. For example, the mapping unit 120 may compare and analyze respective steps of 10 types of secure SDLCs, and normalize and generalize the steps to 10 steps. In addition, the mapping unit 120 may combine all security activities to be performed in the respective steps, and then derive the duplicated security activity, and integrate the derived security activities into one security-by-design methodology. As an example, the mapping unit 120 may generate a mapping result having 10 steps and 66 security activities. However, the present disclosure is not limited thereto. Hereinafter, an example of a method for generating the mapping result by the mapping unit 120 will be described below with reference to FIGS. 3A to 3C.

Meanwhile, the database unit 130 may pre-store the security-by-design methodology and the evidence-based security methodologies. However, the present disclosure is not limited thereto, and when a confidential Secure SDLC is introduced to scholarship and industrial words, related data is added to extend a framework.

Meanwhile, in the present disclosure, the database unit 130 may store the mapping result mapped by the mapping unit 120. Hereinafter, the database unit 130 will be described below with reference to FIG. 2.

Meanwhile, according to some exemplary embodiments of the present disclosure, a schema of the database unit 130 may be constituted by a plurality of tables. Here, the schema may be a size of a record constituting the database unit 130, a definition of a key, a relationship between the records, a search method, etc. However, the present disclosure is not limited thereto.

Meanwhile, a first table of the plurality of tables included in the database unit 130 may store 10 steps of the integrated security-by-design methodology. Further, a second table may store 66 security activities to be performed for each step. Further, a third table may store a total of 221 detailed security activities by combining by 63 warranty requirement components defined in ISO/IEC 15408-CC part 3 and ISO/ IEC 8405-CEM, 104 detailed inspection items defined in ISO/IEC 27001 ISMS, and 54 detailed evaluation items defined in ISO/IEC 27701-PIMS. In addition, a fourth table may store a template of documents to be produced, which is a mapping result with the warranty requirement items of ISO/IEC 15408-CC and ISO/IEC 8405-CEM. However, the present disclosure is not limited thereto.

Meanwhile, the database unit 130 may include a memory and/or a persistent storage medium. The memory may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk.

Meanwhile, the level difference analysis unit 150 may be used for quantitatively analyzing the difference between the rival company and the enterprise based on the level generated by the level extraction unit 140.
Specifically, the level difference analysis unit 150 may provide first information by quantitatively analyzing a security-by-design methodology level difference between the rival company and the enterprise based on the average security-by-design methodology level of the rival company and the security-by-design methodology level of the enterprise. Here, the first information may be information quantitatively indicating the difference of the security-by-design methodology level in a graph form. However, the present disclosure is not limited thereto.

For example, when the enterprise and the rival company of the enterprise are selected, the level difference analysis unit 150 may generate a graph for quantitatively representing the difference in the security-by-design methodology level between the enterprise and the rival company. In this case, the user may determine insufficient step and security activities among the activities of the security-by-design methodology at a glance, and easily determine a problem in the activities of the security-by-design methodology of the enterprise. Hereinafter, contents related to the level difference analysis unit 150 and the graph generated by the level difference analysis unit 150 will be described below with reference to FIG. 6.

Meanwhile, in the present disclosure, the security-by-design methodology level as an index considering functional correctness, safety integrity, and security assurance may be constituted by a plurality of steps.

For example, the security-by-design methodology level may be constituted by 7 steps, and a higher step may mean that the security-by-design methodology level is more systematically and strictly managed.

Meanwhile, in the present disclosure, when the level extraction unit 140 maps only one attribute of the functional correctness, the safety integrity, and the security assurance, the level extraction unit 140 may calculate the level of the corresponding attribute. Alternatively, when two or more attributes are mapped, the level extraction unit 140 may coordinate the level through a security activity execution status. The level produced through such a process may be derived for each security activity. In addition, the result is output in the graph form to determine the security-by-design methodology level at a glance. However, the present disclosure is not limited thereto. Meanwhile, the information generation unit 160 may provide second information for at least one required security activity related to the appropriate security-by-design methodology level of the level desired by the enterprise among at least one security activity included in the mapping result.

For example, the information generation unit 160 may derive at least one of the security-by-design methodology level of the level desired by the enterprise, the security activity, the detailed security activity, and the document to be produced based on the result generated by the level difference analysis unit 150. However, the present disclosure is not limited thereto. Hereinafter, contents on the second information provided by the information generation unit 160 will be described below with reference to FIG. 5.

Meanwhile, according to some exemplary embodiments of the present disclosure, when the difference in security-by-design methodology level between the enterprise and the rival company is too large, it is difficult to reach the level of the rival company at once, and as a result, the information generation unit 160 may construct the security-by-design methodology level of the level desired by the enterprise. However, the present disclosure is not limited thereto.

Meanwhile, in the present disclosure, the server 100 may receive information on the enterprise and the rival company from the user through the user input unit or the communication unit. In this case, the information generation unit 160 may select security activities related to the enterprise and the rival company among 66 security activities generated through the mapping unit 120 based on the characteristics of the enterprise and the rival company. In addition, the information generation unit 160 may generate a detailed security activity and a document to be produced for achieving the security-by-design methodology level of the level desired by the enterprise based on the information received from the enterprise. In this case, the document to be produced is easily derived to ensure traceability. Further, when a security problem occurs on a site, a cause may be determined and it is possible to rapidly cope with the security problem. However, the present disclosure is not limited thereto.

FIG. 2 is a flowchart for describing an example of a method for storing a mapping result in a database by a server according to some exemplary embodiments of the present disclosure.

Referring to FIG. 2, the mapping unit 120 of the server 100 may map the security-by-design methodology and the evidence-based security methodology (S110).

Specifically, the mapping unit 120 may compare and analyze respective steps of a plurality of secure SDLC standards and guidelines included in the security-by-design methodology. In addition, the mapping unit 120 may combine duplicated security activities among the security activities included in the security-by-design methodology. For example, the mapping unit 120 may compare and analyze respective steps of 10 types of secure SDLCs, and normalize and generalize the steps to 10 steps. In addition, the mapping unit 120 may combine all security activities to be performed in the respective steps, and then derive the duplicated security activity, and integrate the derived security activities into one security-by-design methodology. In this case, the mapping unit 120 may generate a security-by-design methodology having 10 steps and 66 security activities. Hereinafter, the security-by-design methodology having 10 steps and 66 security activities will be described below with reference to FIGS. 3A to 3C.

Meanwhile, when the security-by-design methodology is integrated and generated, the mapping unit 120 may map the evidence-based security methodology to the security-by-design methodology.

Specifically, the mapping unit 120 may first perform mapping to the security-by-design methodology by using 63 warranty requirements defined in ISO/IEC 15408-CC part 3 and ISO/IEC 8405-CEM in the evidence-based security methodology.

Meanwhile, among 66 security activities generated by the mapping unit 120 of the server 100, there may be an item which is not handled in ISO/IEC 15408-CC. For example, security and privacy information protection related training, security training related scheduling planning, and security training roadmap establishment may not be included in ISO/IEC 15408-CC. Accordingly, the mapping unit 120 may perform mapping to the security-by-design methodology by using 104 detailed inspection items defined in ISO 27001-ISMS.

Meanwhile, among 66 security activities generated by the mapping unit 120 of the server 100, there may be an item which is not handled in ISO/IEC 15408-CC and ISO 27001-ISMS. For example, a privacy information protection influence evaluation may not be included in ISO/IEC 15408-CC and ISO 27001-ISMS. Accordingly, the mapping unit 120 may perform mapping to the security-by-design methodology by using 54 detailed evaluation items defined in ISO/IEC 27701-PIMS with respect to the security activities to be performed from the viewpoint of privacy information protection.

Consequently, the mapping unit 120 performs mapping between a total of 221 detailed items and 66 security activities by combining 63 warranty requirement components of ISO/IEC 15408-CC, 104 detailed inspection items of ISO 27001-ISMS, and 54 detailed evaluation items of ISO/IEC 27701-PIMS to generate detailed security activities and a document to be produced. However, the present disclosure is not limited thereto. Meanwhile, 221 detailed security activities in which the mapping unit 120 according to the present disclosure performs mapping to 66 security activities will be described below with reference to FIG. 4.

Meanwhile, according to some exemplary embodiments of the present disclosure, the mapping unit 120 of the server 100 may derive a product list by mapping an evidence-based security methodology standard to the security-by-design methodology. Here, a product may be acquired by a security related item to a document calculated in conventional software engineering. However, the present disclosure is not limited thereto.

Meanwhile, when all products are derived by mapping 66 security activities to ISO/IEC 15408-CC which is a representative evidence-based security methodology standard, a security activity for organization or privacy information may be supplemented with ISO 27001-ISMS and ISO/IEC 27701-PIMS.

Specifically, ISO/IEC 15408-CC may include a security requirement of Part 2 for evaluating the security, and a warranty requirement of Part 3 for evaluating a warranty level and ISO/IEC 8405-CEM. Here, the warranty requirement of ISO/IEC 15408-CC Part 3 and ISO/IEC 8405-CEM may be classified into requirement analysis, development, installation, and operation, lifecycle support, test, and vulnerability analysis steps. In addition, since the warranty requirement is similar to the step of the security-by-design methodology, most security activities may be covered. Further, the warranty requirement may include detailed items to be performed for each step, and include detailed required conditions which documents to be produced should satisfy. Accordingly, by using this, specific detailed security activities may be defined, and a template of documents to be produced may be generated. Here, the template may be a sample document including a format for generating a document related to the product, etc. However, the present disclosure is not limited thereto.

As described above, when the mapping unit 120 of the server 100 maps the security-by-design methodology and the evidence-based security methodology, a mapping result including at least one security step, at least one security activity, at least one detailed security activity, and the product may be generated. However, the present disclosure is not limited thereto.

Meanwhile, the processor 110 of the server 100 may store the mapping result in the database (S120). Hereinafter, contents on the mapping result according to the present disclosure will be described below with reference to FIGS. 3 and 4.

Meanwhile, according to some exemplary embodiments of the present disclosure, the mapping result may include security-by-design methodology level information. In this case, the level extraction unit 140 may recognize a security-by-design methodology level of the enterprise based on the security-by-design methodology level information. Here, a method in which the level extraction unit 140 recognizes the security-by-design methodology level of the enterprise based on the security-by-design methodology level information included in the mapping result will be described below with reference to FIG. 5.

FIGS. 3A to 3C are diagrams for describing an example of a mapping result stored in a database unit according to some exemplary embodiments of the present disclosure.

Referring to FIGS. 3A to 3C, the mapping result of the security-by-design methodology stored in the database unit 130 of the server 100 may include at least one security step, at least one security activity, and a product. However, the present disclosure is not limited thereto.

A first step may be a step for security training. In addition, the first step may include three security activities.

Specifically, the security activity of the first step may include at least one of basic security training, intensifying security training, and security training related schedule planning. However, the present disclosure is not limited thereto.

Meanwhile, the first step may include a plan for a training schedule, a target to be trained, a training curriculum, etc., and a list of persons who complete the training, but as the security is considered, training contents related to the security may be added in the conventional training. Accordingly, a product list of the first step may include at least one of a written security training plan and a training participant list. However, the present disclosure is not limited thereto.

Meanwhile, a second step may be a step for initiation and plan. In addition, the second step may include nine security activities.

Specifically, the security activity of the second step may include at least one of security activities such as project categorization, role identification, selection of a tool to be used for a project, security requirement source identification, minimum quality and security level definition, establishment for a compensation system for security issue processing, security schedule planning and management, security goal setting, and verification of consistency and completeness of a security goal. However, the present disclosure is not limited thereto.

Meanwhile, in the second step, a written current process analysis and a written current system analysis may be produced in the same manner as the conventional security-by-design methodology. However, a written project plan which handles a plan for a project schedule, a project range, a role, etc., and a written requirement definition that specifies a requirement of the user should be able to calculate a range to consider the security and additionally include a security function requirement. Accordingly, a product list of the second step may include at least one of the written current process analysis, the written current system analysis, the written project plan, and the written requirement definition. However, the present disclosure is not limited thereto.

Meanwhile, a third step may be a step for a requirement analysis. In addition the third step may include nine security activities.

Specifically, the security activity of the third step may include at least one of a project security analysis range calculation, a written impact evaluation, a written interface definition, privacy information protection impact evaluation, business impact evaluation, safety impact evaluation, conventional software evaluation, function requirement derivation, security requirement derivation, judgment of conformity for a requirement for each field and collision or not, and verification of a requirement according to the security goal. However, the present disclosure is not limited thereto.

Meanwhile, in the third step, the conventional security-by-design methodology may analyze only a business impact degree. However, in the present disclosure, a written impact evaluation may be produced, which additionally analyzes security and privacy impact degrees. Further, in a written interface definition which specifies an identifier, a purpose, a use method, etc., for the conventional interface, the interface may be classified and specified according to a degree of executing the security function (direct execution, indirect execution, etc.). Accordingly, a product list of the third step may include at least one of the written impact evaluation and the written interface definition. However, the present disclosure is not limited thereto.

Meanwhile, a fourth step may be a step for acquisition. In addition, the fourth step may include three security activities.

Specifically, the security activity of the fourth step may include at least one of acquisition range and plan establishment, definition of a security requirement for a third-party component, evaluation of the security requirement for the third-party component, and a test. However, the present disclosure is not limited thereto.

Meanwhile, in the fourth step, a written acquisition examination should be produced, which examines a component developed by a third party. Accordingly, the product list of the fourth step may include the written acquisition examination. However, the present disclosure is not limited thereto.

A fifth step may be a step for design. In addition, the fifth step may include twelve security activities.

Specifically, the security activity of the fifth step may include at least one of security function design and specification, design exemplary case and principle compliance, structure design for an integration process, asset identification, data flowchart creation, threat derivation, attack library collection, danger analysis, mitigation plan derivation, privacy information protection analysis, use and misuse case identification, and design verification according to the requirement. However, the present disclosure is not limited thereto.

Meanwhile, in the fifth step, a design specification which specifies a design for the class, the component, the database, etc., should be able to specify the design by classifying the module according to a degree of executing the security function. Further, a written software architecture design and a written system architecture design should be able to be specified so as to prove that the security function accurately operates according to a security policy and there is no bypass. Further, a written integrated test plan and a written test scenario for designing the module and verifying inter-module integration should be able to additionally include integration contents between security modules. Accordingly, the product list of the fifth step may include at least one of a design specification, a written SW architecture design, a written system architecture design, a written integrated test plane, and an integrated test scenario. However, the present disclosure is not limited thereto.

A sixth step may be a step for implementation. In addition, the sixth step may include three security activities.

Specifically, the security activity of the sixth step may include at least one of coding guideline compliance, release guide document and tool creation, and implement verification according to the design. However, the present disclosure is not limited thereto.

Meanwhile, in the sixth step, a source code developed by complying with a security coding guideline considering the security should be produced, and a written unit test plane and a test scenario for testing the security module should be able to be produced. Accordingly, a product list of the sixth step may include at least one of the source code, the written unit test plan, the test scenario, and a written unit test result. However, the present disclosure is not limited thereto.

Meanwhile, a seventh step may be a step for verification. In addition, the seventh step may include eight security activities.

Specifically, the security activity of the seventh step may include at least one of manual static analysis, automatic static analysis, dynamic analysis, integration and acquisition test, penetration test, threat model review and update, minimum quality and security level review, and security document review and update. However, the present disclosure is not limited thereto.

Meanwhile, in the seventh step, a written test plane and a test scenario for integration, a system, and the acquisition test considering the security should be able to be produced. Further, as the vulnerability analysis which is not executed in the conventional development process is executed, a written vulnerability analysis should be able to be produced. Accordingly, a product list of the seventh step may include at least one of the written integration/system/acquisition test plane and the test scenario, and the written integration/system/acquisition test result and the written vulnerability analysis. However, the present disclosure is not limited thereto.

An eighth step may be a step for release. In addition, the eighth step may include seven security activities.

Specifically, the security activity of the eighth step may include at least one of final security review, final privacy information protection review, requirement derivation for production, production procedure determination, verification for production, emergency accident response plane, and security review for a release process. However, the present disclosure is not limited thereto.

Meanwhile, in the eighth step, the quality is finally reviewed conventionally, while as final review contents for the security and the privacy are added, a written rehearsal plan and a written rehearsal result should be able to be produced. Further, a written release request should be produced, in which both a physical security countermeasure and a logical security countermeasure are considered in the conventional release process. Furthermore, in the product list of the eighth step, the written emergency accident response plan and the written emergency accident response result should be able to be produced against an emergency accident after release. Accordingly, the product list of the eighth step may include at least one of the written rehearsal plan and the written rehearsal result, the written release request, the written emergency accident response plane, and the written emergency accident response result. However, the present disclosure is not limited thereto.

Meanwhile, a ninth step may be a step for operation. In addition, the ninth step may include seven security activities.

Specifically, the security activity of the ninth step may include at least one of monitoring target index and data collection, reporting strategy identification, continuous monitoring, vulnerability reporting, evaluation for the vulnerability, solution establishment, vulnerability publication, update management, and shape management after release. However, the present disclosure is not limited thereto.

Meanwhile, in the ninth step, a written installation result, an operator guideline, and a user guideline including safe installation and operation guide lines on the security and an error message for restricting information to an attacker, a security countermeasure which should be satisfied in an operating environment, etc., should be produced. Further, a written response plan and a patch result should be produced for vulnerability which occurs in an operating step. Accordingly, the product list of the ninth step may include at least one of a written installation result, an operator guideline, a user guideline, a written vulnerability response plane, and a written vulnerability patch result. However, the present disclosure is not limited thereto.

Meanwhile, a tenth step may be a step for disposal. In addition, the tenth step may include five security activities.

Specifically, the security activity of the tenth step may include at least one of disposal and transition plan establishment, important information preservation, complete medium removal, hardware and software disposal, and system shutdown. However, the present disclosure is not limited thereto.

Meanwhile, in the tenth step, system use is planned and executed in executing the project, and a written system execution plan and a written execution result should be able to be produced, which plan and execute system use in executing the project, and plan and execute transferring or disposing the system. Accordingly, the product list of the tenth step may include at least one of the written system execution plan and the written system execution result. However, the present disclosure is not limited thereto. Meanwhile, in the present disclosure, the database unit 130 may include a mapping table including a source of the evidence-based security methodology standard for ensuring traceability of each step.

For example, the third step among 10 steps included in the step-by-design methodology may be the 'requirement analysis step'. In addition, a 19-th security activity included in the third step may be the 'security requirement derivation'. In this case, the 'security requirement derivation' security activity may be mapped to 'ASE_REQ.1 Security requirement' warranty requirement component of ISO/IEC 15408-

CC and '8.1.1 Security requirement definition' detailed inspection item of ISO/IEC 27001 ISMS. In this case, a document which should be produced in the 'requirement analysis step' which is the third step may be 'software requirement specification (SRS) considering security'. In addition, the template of the document includes a mapping table between the interface and the security function requirement to ensure traceability between both elements. Accordingly, when a security problem occurs in an actual site, a cause may be determined and the security countermeasure may be rapidly devised through the mapping table. However, the present disclosure is not limited thereto.

As described above, the security-by-design methodology according to the present disclosure may include 10 steps, 66 security activities, and the product list.

Meanwhile, according to some exemplary embodiments of the present disclosure, the mapping result may further include at least one detailed security activity. Hereinafter, the mapping result according to the present disclosure will be described in more detail with reference to FIG. 4.

FIG. 4 is a diagram for describing an example of a mapping result according to some exemplary embodiments of the present disclosure.

Referring to FIG. 4, the mapping unit 120 of the server 100 may utilize detailed items included in the evidence-based security methodology. As an example, the mapping unit 120 may utilize detailed items included in three standards such as ISO/IEC 15408-CC, ISO 27001-ISMS, and ISO/IEC 27701-PIMS.

Specifically, the mapping unit 120 may utilize 63 warranty requirement components included in the ISO/IEC 15408-CC standard. More specifically, the mapping unit 120 may utilize warranty requirement components such as 10 components included in a security goal specification classification, 19 components included in a development classification, 2 components included in an installation and operation classification, 18 components included in a lifecycle support classification, and 9 components included in a test and vulnerability evaluation classification.

Meanwhile, the mapping unit 120 may utilize 104 detailed inspection items included in the ISO 27001-ISMS standard. Specifically, the mapping unit 120 may utilize detailed examination items such as 6 detailed examination items included in an information protection policy, 4 detailed examination items included in an information protection organization, 3 detailed examination items included in an outsider security, 3 detailed examination items included in an information asset classification, 4 detailed examination items included in information protection training, 5 detailed examination items included in a personnel security, 9 detailed examination items included in a physical security, 10 detailed examination items included in a system development security, 2 detailed examination items included in password control, 14 detailed examination items included in access control, 22 detailed examination items included in an operation security, 7 detailed examination items included in infringement accident management, 3 detailed examination items included in IT disaster restoration, and 12 detailed examination items included in information protection management.

Meanwhile, the mapping unit 120 may utilize 54 detailed evaluation items included in the ISO/IEC 27701-PIMS standard. Specifically, the mapping unit 120 may utilize detailed evaluation items such as 8 detailed evaluation items included in a privacy information protection management system of a target institution, 6 detailed evaluation items included in the privacy information protection management system of a target system, 12 detailed evaluation items included in a protective action for each privacy information processing step, 19 detailed evaluation items included in a technical protection action of the target system, and 9 detailed evaluation items included in privacy information protection upon utilizing specific IT technology.

Consequently, the mapping unit 120 executes mapping of 221 detailed items and 66 security activities derived from 3 standards to define at least one detailed security activity and create a document to be produced. However, the present disclosure is not limited thereto.

FIG. 5 is a flowchart for describing an example of a method for providing second information by a server according to some exemplary embodiments of the present disclosure.

Referring to FIG. 5, the level extraction unit 140 of the server 100 may recognize characteristics of the enterprise and a current status of the security-by-design methodology of the enterprise (S210).

As an example, the level extraction unit 140 may determine the characteristics and the current status of the enterprise based on information received from the enterprise through a user input unit (not illustrated) and a communication unit (not illustrated). Here, the characteristics of the enterprise may be a business type of a business executed by the enterprise or a business condition. However, the present disclosure is not limited thereto.

Meanwhile, the level extraction unit 140 of the server 100 may recognize a security-by-design methodology level of the enterprise based on the current status of the security-by-design methodology (S220).

Specifically, the level extraction unit 140 may quantitatively analyze current status the security-by-design methodology executed by the enterprise, and then recognize the security-by-design methodology level of the enterprise. Here, the security-by-design methodology level as an index considering functional correctness, safety integrity, and security assurance may be constituted by a plurality of steps.

For example, the security-by-design methodology level may be constituted by 7 steps, and a higher step may mean that the security-by-design methodology level is more systematically and strictly managed. However, the present disclosure is not limited thereto.

Meanwhile, according to some exemplary embodiments of the present disclosure, the mapping result stored in the database unit 130 of the server 100 may include security-by-design methodology level information. In this case, the security-by-design methodology level information may be security-by-design methodology levels granted to a plurality of detailed security activities included in at least one security activity, respectively. In this case, the level extraction unit 140 may recognize the security-by-design methodology level of the enterprise for each of the at least one security activity based on the security-by-design methodology level information and the current status of the security-by-design methodology. However, the present disclosure is not limited thereto.

Meanwhile, according to some exemplary embodiments of the present disclosure, the level extraction unit 140 of the server 100 may recognize the security-by-design level of the enterprise for at least one step among 10 steps and at least one security activity included in the mapping result.

For example, when the enterprise executes contents related to at least one step included in the mapping result, the level extraction unit 140 may select the corresponding step and the security activity. As another example, when the enterprise does not execute the contents related to at least one step included in the mapping result, the level extraction unit 140 may select the corresponding step and the security activity.

Meanwhile, the level difference analysis unit 150 of the server 100 may recognize a rival company related to the enterprise based on the characteristics of the enterprise and the current status of the security-by-design methodology (S230).

As an example, the level difference analysis unit 150 may recognize an enterprise having a similar business type or a business condition as the rival company based on the characteristics of the enterprise.

As another example, the level difference analysis unit 150 may receive information on the rival company from the enterprise through the user input unit or the communication unit. However, the present disclosure is not limited thereto.

As yet another example, when information on the security-by-design methodology level of at least one rival company which is conventionally analyzed is stored, the level difference analysis unit 150 may recognize a rival company in which the security-by-design methodology level is similar among the conventional rival companies. However, the present disclosure is not limited thereto.

Meanwhile, the level extraction unit 140 of the server 100 may recognize an average security-by-design methodology level of the rival company (S240).

Specifically, the level extraction unit 140 acquires current status information for a security standard of an information protection product executed by the rival company to recognize the average security-by-design methodology level of the rival company. However, the present disclosure is not limited thereto. Hereinafter, a method for recognizing the average security-by-design methodology level of the rival company by the level extraction unit 140 will be described with reference to FIG. 6.

Meanwhile, in the present disclosure, the level extraction unit 140 of the server 100 may receive information an average security-by-design methodology level of the rival company from the enterprise through the communication unit or the user input unit. However, the present disclosure is not limited thereto.

Meanwhile, the level difference analysis unit 150 of the server 100 may provide first information by quantitatively analyzing a security-by-design methodology level difference between the rival company and the enterprise based on the average security-by-design methodology level of the rival company and the security-by-design methodology level of the enterprise (S160).

Specifically, the level difference analysis unit 150 may provide the first information indicating the difference in security-by-design methodology level between the rival company and the enterprise in a graph form. However, the present disclosure is not limited thereto. Hereinafter, contents regarding the first information according to the present disclosure will be described below with reference to FIG. 7.

Meanwhile, in the present disclosure, when the first information is generated, the level difference analysis unit 150 of the server 100 may output the first information through a display unit (not illustrated). As another example, when the first information is generated, the level difference analysis unit 150 may transmit the first information to a terminal related to the enterprise. However, the present disclosure is not limited thereto.

Meanwhile, after providing the first information, the information generation unit 160 of the server 100 may receive an appropriate security-by-design methodology level of a level desired by the enterprise (S260).

As an example, the information generation unit 160 may receive an appropriate security-by-design methodology level of a level desired by the enterprise from the enterprise through the user input unit or the communication unit. However, the present disclosure is not limited thereto.

Meanwhile, the information generation unit 160 of the server 100 may provide second information for at least one required security activity related to the appropriate security-by-design methodology level among at least one security activity included in the mapping result (S270). Here, the second information may include at least one required product mapped to each of at least one required security step including at least one required security activity. However, the present disclosure is not limited thereto.

Meanwhile, in the present disclosure, the information generation unit 160 may select at least one required security step of 10 steps of the security-by-design methodology in the database unit 130 based on the appropriate security-by-design methodology level of the level desired by the enterprise. In this case, at least one required product mapped to at least one required security step may be produced. In addition, the information generation unit 160 may generate a template to be provided to the enterprise based on at least one required product. Here, the template may be a sample document including a format for generating a document related to the product, etc. However, the present disclosure is not limited thereto.

Meanwhile, in the present disclosure, when the second information is generated, the information generation unit 160 of the server 100 may transmit the second information to a terminal related to the enterprise. However, the present disclosure is not limited thereto.

FIG. 6 is a flowchart for describing an example of a method for recognizing an average security-by-design methodology level of a rival company by a server according to some exemplary embodiments of the present disclosure.

Referring to FIG. 6, the level extraction unit 140 of the server 100 may acquire current status information for a security standard of an information protection product executed by the rival company (S241).

As an example, the level extraction unit 140 may receive the current status information from the enterprise through the user input unit or the communication unit. However, the present disclosure is not limited thereto.

Meanwhile, the level extraction unit 140 of the server 100 may recognize an average security-by-design methodology level of the rival company based on the current status information (S242).

Specifically, the level extraction unit 140 may generate the average security-by-design methodology level according to the current status information of the security standard of the information protection product currently executed by the rival company. However, the present disclosure is not limited thereto.

More specifically, the database unit 130 may store a preset value for the security-by-design methodology level of seven steps. In this case, the level extraction unit 140 may compare a mapping result pre-generated by the mapping unit 120 and the current status information executed by the rival company. In addition, the level extraction unit 140 may generate the security-by-design methodology level of the rival company by using the compared result and the preset value. However, the present disclosure is not limited thereto.

FIG. 7 is a diagram for describing an example of a graph generating in order to analyze a difference between an enterprise and a rival company by a server according to some exemplary embodiments of the present disclosure. An x axis of the graph illustrated in FIG. 7 may indicate each of at least one detailed security activity and a y axis may indicate the security-by-design methodology level for each of at least one detailed security activity. In addition, a first line of FIG. 7 may be a line for representing the average security-by-design methodology level of the rival company and a second line may be a line for representing the security-by-design methodology level of the enterprise. g1 and g2 of FIG. 7 may be used for describing a gap formed by a clearance between the first line and the second line.

In FIG. 7, when the level difference analysis unit 150 of the server 100 recognizes that the enterprise executes all of an initial development step to a release and operation step, the level difference analysis unit 150 may recognize that a rival company having a similar feature thereto is Microsoft company which is a representative software development company. Hereinafter, it will be assumed that the rival company is Microsoft and the description will be made.

Meanwhile, the level extraction unit 140 of the server 100 may recognize an average security-by-design methodology level of Microsoft.

Specifically, the level extraction unit 140 may calculate the average security-by-design methodology level of Microsoft based on a case where Microsoft acquires an ISO/IEC 15408-CC authentication conventionally.

For example, in respect to standards of Microsoft for recent 5 years, the ISO/IEC 15408-CC authentication case may be a case for 5 types of database products and 7 types of operating systems. In this case, the level extraction unit 140 may recognize that the average security-by-design methodology level of Microsoft is level 4 based on the authentication case.

Meanwhile, the level difference analysis unit 150 of the server 100 may determine the security-by-design methodology level of the enterprise based on the current status of the security-by-design methodology executed by the enterprise. In addition, the level extraction unit 140 may select a step and a security activity list associated with the enterprise based on the mapping result stored in the database unit 130.

For example, the level extraction unit 140 may select a total of 8 steps such as security training, initiation and planning, requirement analysis, design, implementation, verification, release, and operation steps among 10 steps included in the mapping result. Further, the level extraction unit 140 may select 58 security activities among 66 security activities. In addition, the level extraction unit 140 may generate a security-by-design level for each of 58 security activities.

Meanwhile, when the security-by-design levels of the enterprise and the rival company are generated, the level difference analysis unit 150 may generate a graph for representing a quantitative difference between the enterprise and the rival company. In addition, the generated graph may be expressed as in FIG. 7.

Referring to FIG. 7, the graph may quantitatively represent a difference in the security-by-design methodology level between the rival company and the enterprise based on a gap formed by the clearance between the first line and the second line. Here, the first line may indicate the average security-by-design methodology level of the rival company and the second line may indicate the security-by-design methodology level of the enterprise. However, the present disclosure is not limited thereto.

For example, referring to g1, in the case of the security activity related to selection of a tool to be used for the project in a second step which is the step for the initiation and planning step, the security-by-design methodology level of the enterprise may be 2 and the security-by-design methodology level of the rival company may be 4.

As another example, referring to g2, in the case of the security activity related to the impact evaluation on the business in the third step which is the step for the requirement analysis, the security-by-design methodology level of the enterprise may be 0 and the security-by-design methodology level of the rival company may be 4. However, the present disclosure is not limited thereto.

Meanwhile, in the present disclosure, when the difference in the security-by-design level between the enterprise and the rival company is analyzed, the information generation unit 160 of the server 100 may provide second information for achieving a security-by-design methodology level desired by the enterprise.

As an example, the information generation unit 160 of the server 100 may recognize that a current security-by-design methodology level of the enterprise is difficult to reach the security-by-design methodology level of Microsoft. In this case, the information generation unit 160 may generate at least one required product mapped to each of at least one required security step so as to reach a predetermined level based on the security-by-design methodology level of the enterprise.

As another example, the information generation unit 160 may generate at least one detailed security activity and a product which may reduce the difference of the security-by-design methodology level for each of at least one security activity. However, the present disclosure is not limited thereto.

As described above, since the secure SDLC standards or guidelines of the security-by-design methodology which is currently representatively utilized are too general and do not specific contents, the secure SDLC standards or guidelines may be very difficult to utilize in the actual site. In particular, in a produced document particularly required for ensuring traceability between respective steps, an exemplary template may not be opened or contents of the template may not be concrete. On the contrary, according to the present disclosure, in order to embody the security-by-design methodology according to a level desired by the enterprise, a security-by-design methodology level based security-by-design framework may be provided.

Further, when the security-by-design methodology level based security-by-design framework according to the present disclosure, is used, a security-by-design level difference may be quantitatively analyzed through a gap analysis between the corresponding enterprise and the rival company. Further, an exemplary template for a specific detailed security activity required for constructing security-by-design of a level desired by an organization requiring the security-by-design and a document to be produced is provided to be easily utilized when constructing the security-by-design in the actual site.

FIG. 8 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term "manufactured article" includes computer programs or media which are accessible by a predetermined computer-readable device. For example, a computer readable storage media includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for embodying a security-by-design methodology using a processor of a computing device, the method comprising:

recognizing characteristics of an enterprise and a current status of the security-by-design methodology of the enterprise;

recognizing a security-by-design methodology level of the enterprise based on the current status of the security-by-design methodology;

recognizing a rival company related to the enterprise based on the characteristics and the current status of the security-by-design methodology;

recognizing an average security-by-design methodology level of the rival company;

providing first information by quantitatively analyzing a difference in security-by-design methodology level between the rival company and the enterprise based on the average security-by-design methodology level of the rival company and the security-by-design methodology level of the enterprise;

generating a security method for the enterprise using the security-by-design methodology and the first information, the security method including security steps and security activity;

automatically mapping, using the processor, the security-by-design methodology and an evidence-based security methodology, the evidence-based security methodology including security activities associated with the security steps, the mapping generating a structured mapping result linking the security-by-design methodology to respective products satisfying a respective activity of the evidence-based security methodology for a respective step of the security-by-design methodology;

storing the structured mapping result in a database comprising a plurality of linked tables for efficient retrieval and traceability;

receiving an appropriate security-by-design methodology level requested by the enterprise;

providing second information identifying at least one required security activity and at least one corresponding product related to the requested security-by-design methodology level among the security activities included in the mapping result; and refining the security method based on the mapping result.

2. The method of claim 1, wherein the security steps includes one or more of a first step related to security training, a second step related to initiation and planning, a third step related to requirement analysis, a fourth step related to acquisition, a fifth step related to design, a sixth step related to implementation, a seventh step related to verification, an eighth step related to release, a ninth step related to operation, and a tenth step related to disposal.

3. The method of claim 1, wherein the recognizing an average security-by-design methodology level of the rival company comprises:

acquiring current status information for a security standard of an information protection product executed by the rival company; and recognizing the average security-by-design methodology level of the rival company based on the current status information.

4. The method of claim 1, wherein the mapping result includes security-by-design methodology level information in which security-by-design methodology levels granted to an each of plurality of detailed security activities included in each of the security activities are recorded, and wherein the recognizing a security-by-design methodology level of the enterprise based on the mapping result and the current status of the security-by-design methodology includes, recognizing the security-by-design methodology level of the enterprise for each of the security activities based on the security-by-design methodology level information and the current status of the security-by-design methodology.

5. The method of claim 1, wherein the second information includes one or more required products mapped to a respective required security step including one or more required security activities.

6. The method of claim 1, wherein the providing first information comprises:

generating a graph including the first information quantitatively to illustrate the difference in security-by-design methodology level between the rival company and the enterprise.

7. The method of claim 6, wherein the graph includes an x axis representing security activities of the enterprise, a y axis representing the security-by-design methodology level for each illustrated activity of the security activities, a first line representing the average security-by-design methodology level of the rival company, and a second line representing the security-by-design methodology level of the enterprise.

8. The method of claim 7, wherein the graph quantitatively represents the difference in security-by-design methodology level between the rival company and the enterprise based on a gap formed by a clearance between the first line and the second line.

9. A security-by-design device, comprising:

processors configured to execute instructions; and a memory storing the instructions, wherein execution of the instructions configures the processors to:

recognize characteristics of an enterprise and a current status of the security-by-design methodology of the enterprise;

recognize a security-by-design methodology level of the enterprise based on the current status of the security-by-design methodology;

recognize a rival company related to the enterprise based on the characteristics and the current status of the security-by-design methodology;

recognize an average security-by-design methodology level of the rival company;

provide first information by quantitatively analyzing a difference in security-by-design methodology level between the rival company and the enterprise based on the average security-by-design methodology level of the rival company and the security-by-design methodology level of the enterprise;

generate a security method for an enterprise using a security-by-design methodology and the first information, the security method including one or more of a security step and security activity;

automatically map, using the processors, the security-by-design methodology and an evidence-based security methodology, the evidence-based security methodology including security activities associated with the security steps, the mapping generating a structured mapping result linking the security-by-design methodology to respective products satisfying a respective activity of the evidence-based security methodology for a respective step of the security-by-design methodology;

store the structured mapping result in a database comprising a plurality of linked tables for traceable and practical integration into a security management platform;

receive an appropriate security-by-design methodology level requested by the enterprise:

provide second information for at least one required security activity related to the requested security-by-design methodology level among the security activities included in the mapping result; and refine the security method based on the mapping result.

* * * * *